US011035279B2

United States Patent
Diwakar Abraham et al.

(10) Patent No.: US 11,035,279 B2
(45) Date of Patent: Jun. 15, 2021

(54) METHOD, ENGINE, AND CONTROL SYSTEM FOR CONTROLLING SOOT LOADING OF EXHAUST GAS AFTERTREATMENT COMPONENTS

(71) Applicant: Cummins Inc., Columbus, IN (US)

(72) Inventors: Jeffrey David Selwyn Diwakar Abraham, Columbus, IN (US); Ananth Vemuri, Columbus, IN (US); Michael Haas, Columbus, IN (US); Adam W. Kidd, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/871,659

(22) Filed: May 11, 2020

(65) Prior Publication Data

US 2020/0300190 A1    Sep. 24, 2020

Related U.S. Application Data

(63) Continuation of application No. PCT/US2018/056897, filed on Oct. 22, 2018.
(Continued)

(51) Int. Cl.
   *F01N 9/00*    (2006.01)
   *F01N 3/023*   (2006.01)
   *F02D 41/02*   (2006.01)
   *B01D 46/00*   (2006.01)
   (Continued)

(52) U.S. Cl.
   CPC ............. *F01N 9/002* (2013.01); *F01N 3/023* (2013.01); *F02D 41/029* (2013.01);
   (Continued)

(58) Field of Classification Search
   CPC ..... B01D 46/0063; F01N 3/023; F01N 9/002; F01N 2550/04; F01N 2900/1606; F02D 41/029
   See application file for complete search history.

(56) References Cited

U.S. PATENT DOCUMENTS 7,587,892 B2   9/2009  Dye et al.
8,577,568 B2   11/2013 Sujan et al.
(Continued)

FOREIGN PATENT DOCUMENTS

DE   10 2009 056 844 A1   7/2010

OTHER PUBLICATIONS

Search Report and Written Opinion, PCT Appln. No. PCT/US2018/056897, 7 pgs. dated Dec. 21, 2018.
(Continued)

*Primary Examiner* — Jonathan R Matthias
(74) *Attorney, Agent, or Firm* — Taft, Stettinius & Hollister LLP (57) ABSTRACT

A method, system, and apparatus relating to operating an internal combustion engine include steps or features for determining a performance threshold of a particulate filter disposed in an exhaust gas flow of the engine having a set time interval between regeneration events of the particulate filter; determining a rate at which the particulate filter is reaching the performance threshold; and controlling an exhaust gas characteristic to control the rate so that the performance threshold is reached at or just before an end of the time interval. In an embodiment, there are steps or features for interpreting a filter condition of the particulate filter; determining a particulate matter load rate of the filter as a function of the condition; determining a limit of an
(Continued)

exhaust gas characteristic based on the load rate; and controlling engine operation to control the exhaust gas characteristic to satisfy the limit.

20 Claims, 3 Drawing Sheets

Related U.S. Application Data (60) Provisional application No. 62/585,070, filed on Nov. 13, 2017.

(51) Int. Cl.
*B01D 46/44* (2006.01)
*B01D 46/46* (2006.01)

(52) U.S. Cl.
CPC ...... *B01D 46/0063* (2013.01); *B01D 46/0086* (2013.01); *B01D 46/442* (2013.01); *B01D 46/444* (2013.01); *B01D 46/46* (2013.01); *B01D 2279/30* (2013.01); *F01N 2550/04* (2013.01); *F01N 2900/1402* (2013.01); *F01N 2900/1404* (2013.01); *F01N 2900/1411* (2013.01); *F01N 2900/1606* (2013.01); *F02D 2200/0812* (2013.01)

(56) References Cited

U.S. PATENT DOCUMENTS

| | | | |
|---|---|---|---|
| 8,818,659 | B2 | 8/2014 | Sujan et al. |
| 8,844,271 | B2 | 9/2014 | Huber et al. |
| 9,051,858 | B2 | 6/2015 | Silver et al. |
| 9,194,318 | B2 | 11/2015 | Sujan et al. |
| 9,206,756 | B2 | 12/2015 | Zhu et al. |
| 9,399,937 | B2 | 7/2016 | Alm et al. |
| 2005/0109021 | A1 | 5/2005 | Noirot et al. |
| 2009/0044530 | A1* | 2/2009 | Gallagher ............... F01N 3/023 60/605.1 |
| 2009/0147829 | A1 | 6/2009 | Zhodzishsky et al. |
| 2010/0242444 | A1 | 9/2010 | Wirth et al. |
| 2012/0036841 | A1 | 2/2012 | Xuantian |
| 2013/0197778 | A1* | 8/2013 | Rodriguez ............. F02D 45/00 701/102 |
| 2014/0150406 | A1* | 6/2014 | Goodwin ........... F02D 41/1494 60/274 |
| 2014/0352281 | A1* | 12/2014 | Whitt ..................... F01N 11/00 60/274 |

OTHER PUBLICATIONS

Examination Report Under Sections 12 & 13 of the Patents Act, Counter Indian Appln. Serial No. 202047023914, dated May 3, 2021, 5 pgs.

* cited by examiner

METHOD, ENGINE, AND CONTROL SYSTEM FOR CONTROLLING SOOT LOADING OF EXHAUST GAS AFTERTREATMENT COMPONENTS

CROSS-REFERENCE TO RELATED APPLICATION

The present application is a continuation of PCT Patent Application No. PCT/US18/56897 filed on Oct. 22, 2018, which claims the benefit of the filing date of U.S. Provisional Application Ser. No. 62/585,070 filed on Nov. 13, 2017, each of which is incorporated herein by reference in its entirety.

BACKGROUND

The technical field relates to internal combustion engines. More particularly, the technical field relates to control of exhaust aftertreatment systems for internal combustion engines. When an engine combusts fuel, particularly diesel fuel, the engine out exhaust includes some particulate matter (PM) (e.g. non-methane hydrocarbons), some $O_2$, and some nitrogen oxide gases ($NO_x$). Particulate matter is the result of incomplete combustion of the fuel. $NO_x$ is the result of combusting with atmospheric air, which contains a high ratio of nitrogen ($N_2$) to oxygen ($O_2$). Particulate emissions and $NO_x$ emissions are regulated in many jurisdictions and must be limited in the tailpipe exhaust. To meet $NO_x$ emissions regulations or standards, a $NO_x$ reduction device converts $NO_x$ into $N_2$. Engine operations to meet lower $NO_x$ emission requirements yield high engine-out particulate matter levels. To meet particulate emissions regulations or standards, a particulate filter is commonly used to trap particulate matter from the engine out exhaust, thereby removing it from tailpipe exhaust.

While catching particulate matter, the particulate filter can become clogged when high amounts of particulate matter deposit in the particulate filter, which reduces performance of the engine. Addressing this clogging by removing particulate matter from the particulate filter is called regeneration. Regeneration involves oxidation of the particulate matter (e.g., soot) to remove it from the particulate filter. Conditions in the particulate filter affect the rate of its regeneration, i.e., the rate at which soot is oxidized in the filter, and thus removed. Some key conditions affecting regeneration rate are the current soot load condition of the filter, and the characteristics of the engine out exhaust gas input into the particulate filter, including the exhaust gas temperature, $O_2$ content, $NO_2$ content, and particulate matter content.

In current systems, engine operation is controlled for regeneration purposes based on soot load or engine operation time. Typically, engine operation is controlled to trigger a regeneration event when sensors detect or estimate that the level of soot load in the particulate filter has reached an upper limit, such as a mass of particulate matter per unit volume of the filter (g/L), or when engine controls determine that a pre-set amount of engine operation time has elapsed. Current controls that trigger particulate filter regeneration events on the basis of these triggers create inefficiencies, in that too-frequent regeneration events are triggered, resulting in lowered fuel efficiency of the system due to additional fuel needed to perform regeneration events, and in additional wear on aftertreatment systems caused by unnecessary regeneration events.

There remains a continuing need for improved methods to control engine systems to meet emissions regulations while also maximizing fuel efficiency and the duty life of aftertreatment equipment.

SUMMARY

Various embodiments of the disclosure relate to a method, and related apparatuses such as controls and systems for continuously controlling soot loads and rates of soot loading on aftertreatment systems based on continuous monitoring of conditions in the particulate filter. Disclosed are a method and related apparatus that provide continuous feedback to dynamically inform engine operation to control soot loading on DPF on the basis of actual or estimated conditions in the aftertreatment device, instead of on the basis of current engine operating conditions as in prior art methods and devices. Based on particulate filter conditions such as soot accumulation rates and soot oxidation rates, engine operations within a range of $NO_x$ and temperature are automatically controlled by an optimization system to reduce unnecessary regeneration events. Filter conditions may be determined based on aftertreatment device sensor readings or estimates of, e.g., exhaust gas flow rates through the particulate filter, pressure differential across the filter, and/or particulate matter load on the filter. Filter conditions then may be interpreted by the optimization system to yield a particulate matter load rate. Load rate may be used by the optimizer to determine limits on engine out exhaust gas characteristics (e.g., temperature, $O_2$ levels, $NO_x$ levels, and particulate matter levels) that will maximize the time between filter regeneration events.

The engine operation then is controlled on the basis of requests of the aftertreatment system to deliver the target engine out exhaust gas characteristics, in order to maximize the time between filter regeneration events. The result is closer control of engine operation leading to reduction of the number of premature or unnecessary regeneration events, with the benefits of improved fuel economy and reduced premature wear of the aftertreatment system. The invention yields improved control of regeneration that may allow for reduction of size of the particulate filter of an aftertreatment system due to improved response to degradation over time.

While multiple embodiments are disclosed, still other embodiments of the present invention will become apparent to those skilled in the art from the following detailed description, which shows and describes illustrative embodiments of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
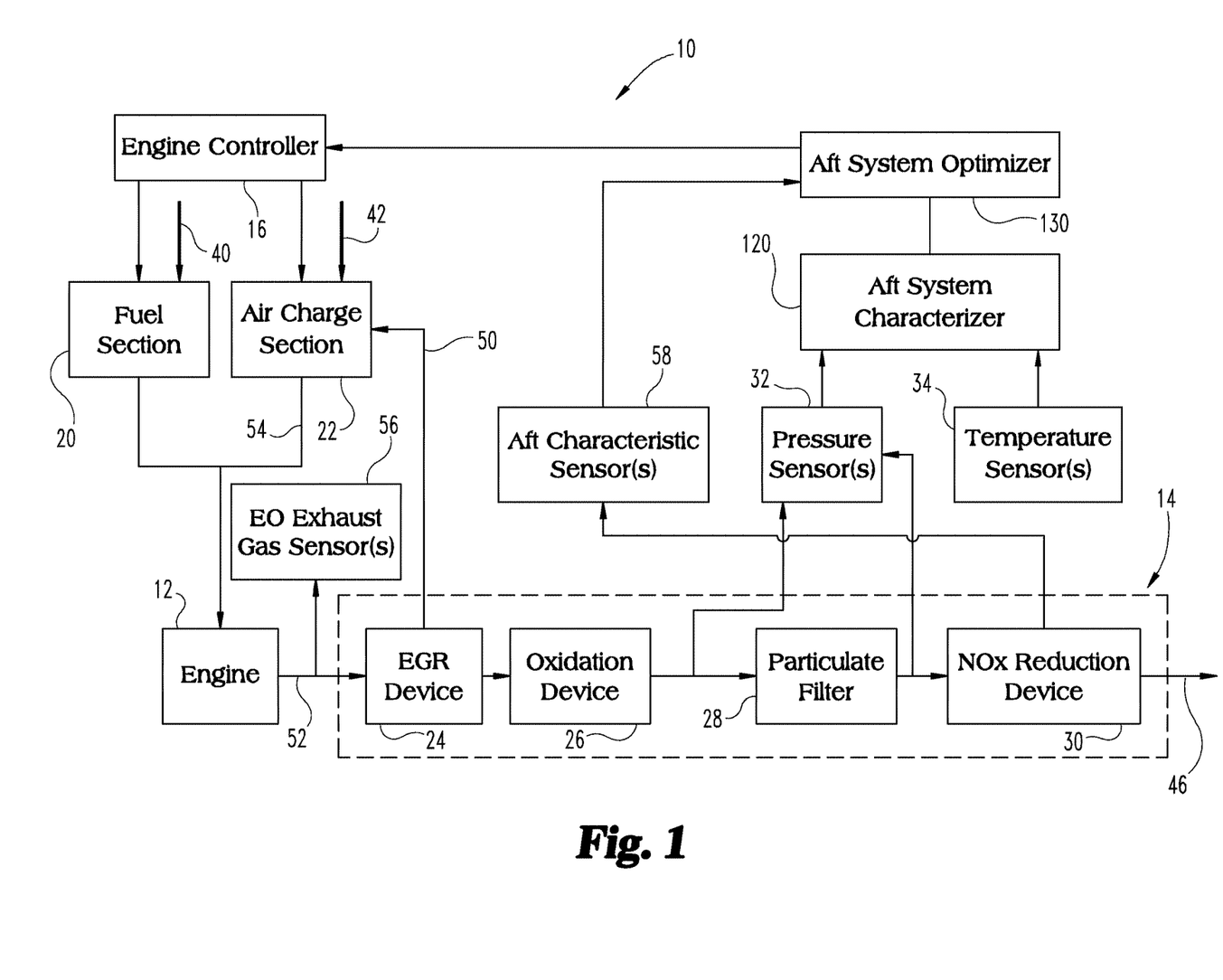
FIG. 1 is a schematic diagram representing an engine system according to some embodiments.

FIG. 1 is a schematic diagram representing an engine system 10 according to some embodiments. The engine system may comprise a prime mover of a vehicle. The engine system may include an internal combustion engine such as a compression ignition (diesel) engine, or other conventional internal combustion engines such as gasoline engines, dual- or multi-fuel engines, or hybrid fuel-electric versions of the same.

The engine system 10 includes an engine 12 (e.g. internal combustion engine), an exhaust system 14 connected to the engine 12 to receive engine out exhaust 52, an engine controller 16 operatively coupled to various components within the engine system 10 to send and receive signals for controlling the engine system 10. The engine system 10 further includes a fuel section 20 for receiving stored fuel 40 and providing fuel to the engine 12 for combustion and an air charge section 22 for receiving intake air 42 and providing air charge 54 to the engine 12 for combustion. For example, the fuel section 20 may provide diesel fuel 40 to the engine 12. The air charge section 22 optionally receives and mixes recirculated exhaust gas 50 with fresh intake air 42 to provide a mixed air charge 54 to the engine 12 for combustion. The fuel section 20 and air charge section 22 can be connected to the engine 12 in various ways known in the art.

Upon combustion of a charge of fuel and air, the engine 12 produces engine out exhaust 52, which is expelled into an exhaust system 14. The exhaust system 14 produces tailpipe exhaust 46 from the engine out exhaust 52. The exhaust system 14 includes an exhaust aftertreatment system to reduce the emissions in the tailpipe exhaust 46 leaving exhaust system 14 by modifying the engine out exhaust 52. In some embodiments, the exhaust aftertreatment system comprises components, such as an exhaust gas recirculation (EGR) device 24, an oxidation device 26 including an oxidation catalyst downstream of the EGR device, a particulate filter 28 downstream of the oxidation device, and a $NO_x$ reduction device 30 downstream of the particulate filter, for example.

At least one pressure sensor 32 is provided. The pressure sensor 32 may provide a signal representing a particulate matter load that is deposited on the particulate filter 28. In some embodiments, the sensor 32 is positioned upstream of the particulate filter 28 and measures a backpressure value detected upstream of the filter 28. The backpressure value may be interpreted to determine or estimate a particulate matter load that is deposited on the particulate filter 28. In some embodiments, as illustrated in FIG. 1, the pressure sensor 32 may have be comprised of pressure sensor units that are positioned at two points, one upstream and one downstream of the particulate filter 28 to detect pressure values at both points. This measurement will provide two detected pressure values to compare across the filter 28, which may be interpreted to yield a pressure differential value, to use to determine or estimate a particulate matter load that is deposited on the particulate filter 28.

Also shown in FIG. 1 is temperature sensor 34, which may provide a signal representing a temperature of the exhaust gas 52 detected at one or more points along the flow of exhaust gas in the exhaust system 14. Sensor units may measure temperature of the exhaust gas 52 at an output point from the diesel oxidation catalyst 26, at a point of exhaust gas input into the filter 28 or within the body of the filter 28.

Also schematically represented in FIG. 1 is one or more engine out exhaust gas sensors 56 which may detect engine out exhaust gas characteristics in the exhaust gas flow out of the engine, including the $O_2$ content of engine out exhaust gas 52, the $NO_x$ content of engine out exhaust gas 52, a lambda value of engine out exhaust gas 52, or a particulate matter content of engine out exhaust gas 52. The sensor(s) 56 may be operatively connected to sense and communicate exhaust gas conditions from different points along the exhaust system 14, including before, after, and within the EGR device 24, the oxidation device 26, the particulate filter 28, and/or the $NO_x$ reduction device 30. One or more aftertreatment characteristics sensors 58 may detect conditions in components of the exhaust system 14. For example, the aftertreatment characteristic (or characterizing) sensor 58 may be a radio frequency (RF) soot load sensor that detects soot load levels or soot loading rates in the particulate filter.

As shown in FIG. 1 and described in more detail with respect to FIG. 2 below, an embodiment includes a control system, in the nature of an aftertreatment optimization system. The control system may preferably include a module in the nature of a characterizer 120, represented as an aft system characterizer 120, which receives signals from one or more pressure sensors 32, and one or more temperature sensors 34, representing pressure values and temperature values detected by the sensors. The characterizer 120 also may preferably receive signals from one or more engine out exhaust gas sensors 56, the signals representing values of engine out exhaust gas characteristics, which may include values representing the $O_2$ content of engine out exhaust gas 52, the $NO_x$ content of engine out exhaust gas 52, the lambda value of engine out exhaust gas 52, and/or the particulate matter content of engine out exhaust gas 52. The system may also preferably include an aftertreatment system optimizer 130 that receives signals from the characterizer 120, interprets the signals, and sends optimization signals to the engine controller 16. The optimization system may comprise or be embodied by a module, a routine, or a component, or a combination of these.

Figure 2:
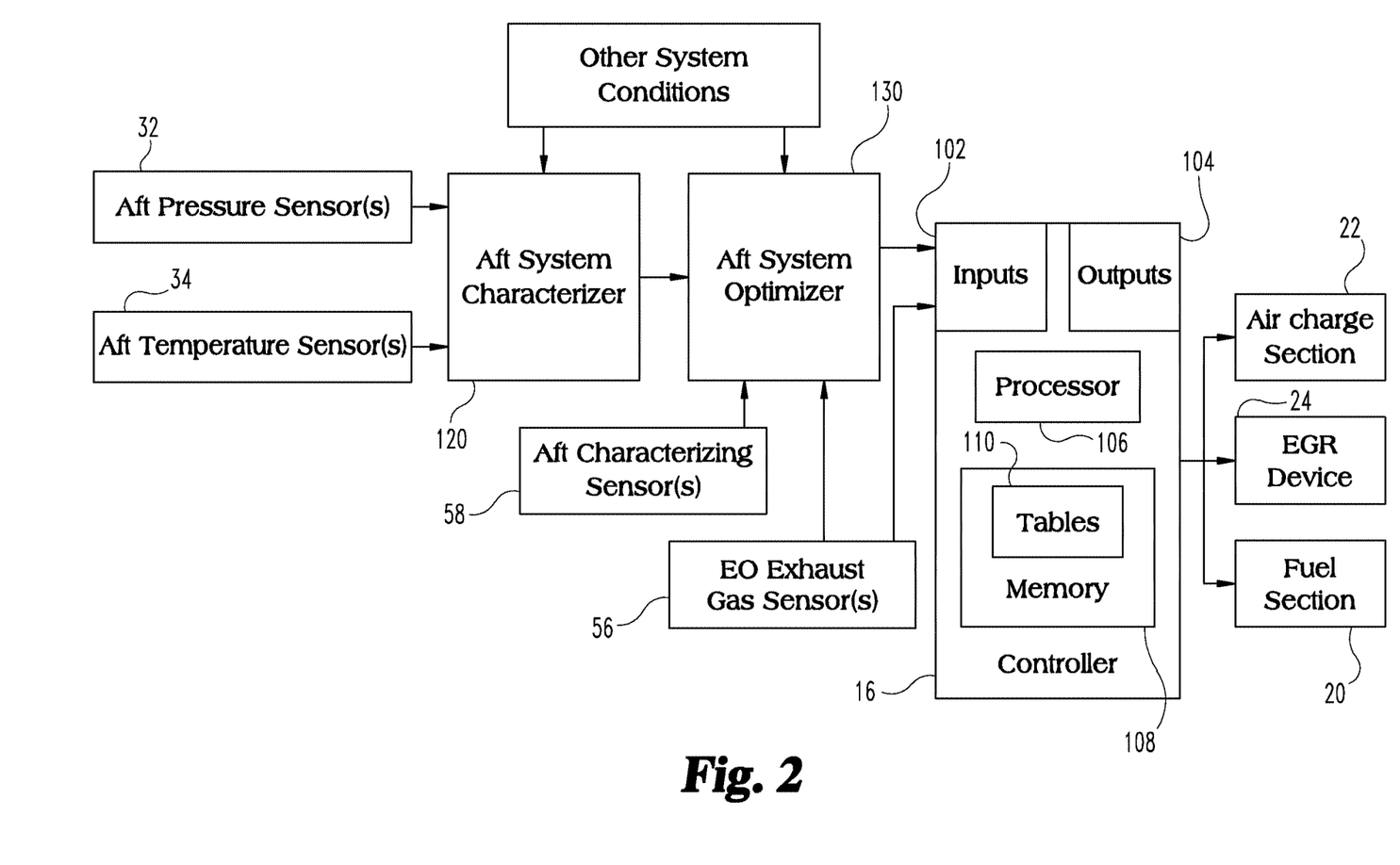
FIG. 2 is a schematic diagram representing an engine control system according to some embodiments.

In an embodiment as seen in the schematic diagram depicting the engine system in FIG. 2, the aftertreatment system characterizer 120 and aftertreatment system optimizer 130 are provided to optimize regeneration of the particulate filter 28. The particulate filter 28 traps particulate matter (PM). In some embodiments, the particulate filter 28 includes a diesel particulate filter (DPF). As the particulate matter accumulates within the particulate filter 28, pressure builds in the exhaust system 14 upstream of the particulate filter 28, sometimes known as backpressure, as a result of the constricted exhaust flow. To relieve such backpressure, regeneration is necessary to remove excess particulate matter (e.g., soot) accumulated in the particulate filter 28.

Regeneration of the particulate filter 28 can be performed by soot oxidation, that is, exposing the particulate matter to $O_2$ at a high temperature (e.g. 400 to 600 degrees C.) or to nitrogen dioxide ($NO_2$) at a relatively lower temperature (200 to 300 degrees C.). Between these temperature ranges (e.g., at a range of 300 to 500 degrees C.) both $O_2$ and $NO_2$ based regeneration may occur. Parameters affecting the rate of soot oxidation in the particulate filter 28 include the temperature of exhaust gas input into the filter; the $O_2$, $NO_2$, soot, and hydrocarbon concentrations in the exhaust gas input into the filter; the flow rate through the filter; and the level of soot load present in the filter. Recent improvements in fuel efficiency have resulted in lower engine out exhaust temperatures, which in turn may result in lower rates of passive regeneration.

Engine out exhaust 52 often contains a sufficient amount of oxygen to regenerate the particulate filter 28. However, because the temperature required to regenerate using oxygen is higher than a nominal temperature for exhaust gas 52 during nominal engine operation, using oxygen to regenerate is often required, and is referred to as active regeneration. In active regeneration, engine operation is controlled to increase the engine out exhaust temperature in order to accomplish active regeneration using the available oxygen. Active regeneration events may be triggered by performance thresholds, such as when a sensor indicates that the particulate matter load level in the filter 28 has reached a predetermined upper limit, or when a set interval of engine operation time has elapsed. The increase in filter temperature required for active regeneration is accomplished by additional engine fuel usage, which lowers overall fuel efficiency of the system. Increased frequency of active regeneration events also tends to cause premature wear of exhaust aftertreatment components due to repeated exposure to high temperatures.

Engine out exhaust 52 often contains an amount of $NO_2$ that may be effective for passive regeneration. Passive regeneration using $NO_2$ present in the engine out exhaust gas 52 does not require a temperature in the particulate filter 28 that is higher than a normal temperature in the particulate filter 28 caused by nominal engine operation. In that regard, passive regeneration is desirable insofar as it may aid overall fuel economy by delaying the reaching of the performance threshold that triggers active regeneration, such as reaching the upper limit of particulate matter load level, and thus limiting the frequency of active regeneration events. Among the factors affecting the rate of passive oxidation is the ratio of $NO_x$ to particulate matter content in engine out exhaust gas 52, with a higher ratio increasing the rate of passive soot oxidation. An increased temperature of exhaust gas 52 as inlet to the oxidation catalyst 26 and/or inlet to the particulate filter 28 also may increase the rate of particulate matter oxidation. An oxidation device 26 including an oxidation catalyst in the aftertreatment system can provide increased $NO_2$ amounts by converting nitric oxide (NO) to nitrogen dioxide ($NO_2$). However, the increased amount of $NO_2$ is often insufficient to keep the particulate filter 28 from clogging without also resorting to active regeneration. Furthermore, $NO_2$ is an emission that must be limited at tailpipe exhaust 46. Thus, time periods of active regeneration by $O_2$ are still required to keep the particulate filter 28 from clogging.

Improved control of DPF soot loading according to an embodiment shown in FIG. 2 employs the aftertreatment system characterizer module 120 (AFT System Characterizer) that receives input signals from sensors. These sensors may preferably include the aftertreatment pressure sensor 32, the aftertreatment temperature sensor 34, and other various engine out exhaust gas sensors 56 and aftertreatment characteristics sensors 58, such as radio frequency (RF) soot load sensors. The input signals represent detected conditions in the particulate filter 28, the conditions preferably including one or more of a pressure differential across the particulate filter 28 and an exhaust gas temperature in the particulate filter. The detected conditions may be interpreted by the characterizer 120 to determine or estimate a level of particulate matter load currently present on the filter 28. For example, a particular increase in pressure differential may indicate a particular level of particulate matter load. The detected conditions in the particulate filter may include an exhaust flow rate through the particulate filter, or other sensor readings representing an actual or estimated particulate matter load level in the filter.

The characterizer 120 also may preferably receive input signals from one or more engine out exhaust gas sensors 56. These signals may preferably represent values of engine out exhaust gas characteristics read by the sensors 56, such as the $O_2$ content, $NO_x$ content, lambda values, and/or particulate matter content of engine out exhaust gas 52.

The FIG. 2 embodiment also preferably includes an aftertreatment system optimizer 130 (AFT System Optimizer), which may receive from the characterizer 120 a signal representing the determined or estimated particulate matter load level. The optimizer 130 may interpret the determined or estimated particulate matter load level in the filter in connection with the filter temperature, and other system conditions such as engine out exhaust gas characteristics. This interpretation of the particulate matter load level with respect to other system conditions may be undertaken by the optimizer 130 to determine or estimate the particulate matter load rate, which represents an current (actual) or predicted amount of increase (additional loading) or decrease (burning) of the particulate matter load in the filter as a function of time. The optimizer 130 interprets the determined load rate and sets a target particulate matter load rate based on its interpretation of the load rate and other system conditions, such as engine out exhaust gas temperature, engine out exhaust gas particulate matter content and concentration level, and engine out exhaust gas concentration levels of $O_2$ and/or $NO_2$.

The optimizer 130 may, for example, determine and set a target load rate based upon the conditions of the particulate filter such that a predetermined particulate matter load limit is reached at an optimum time. For example, the optimum time may be shortly before or at a predetermined time for an active regeneration event based on engine operating time. In this manner, the target load rate is determined by the optimizer 130 based on actual or estimated particulate filter conditions so as to continuously control soot loading rates so as to delay regeneration events directly in response to actual or estimated particulate filter conditions. Thus, the characterizer 120 and optimizer 130 may aid in delay of regeneration events, and thus, prevention of unnecessary active regeneration events that are triggered by, for example, the filter reaching its predetermined particulate matter load limit.

The optimizer 130 interprets the target load rate in order to determine and set a target value (or range of values) for particulate filter input conditions that are preferred for optimizing engine operations in order to continuously control soot loading rates, in order to prevent premature or unnecessary regeneration events. For example, the optimizer 130 may interpret the target load rate to determine and set a target value, or limit, for particulate filter input conditions. The value or limit may include input condition parameters including, for example, one or more of engine out exhaust gas characteristics, including one or more of temperature, engine out exhaust gas particulate matter content and concentration level, and engine out exhaust gas concentration level of $O_2$ and/or $NO_2$.

The optimizer 130 generates a signal representing the set target value for such input conditions and including a command for engine operational control needed to reach the target value. The target value command signals are communicated by the optimizer 130 to the engine controller 16. Because the target value (or range of values), and the corresponding engine operational command, are determined by the optimizer 130 based on actual or estimated particulate filter conditions, the optimizer may thus provide engine operation commands that control engine operations so as to continuously control soot loading rates, so as to delay regeneration events, directly in response to actual or estimated particulate filter conditions. Thus, the characterizer 120 and optimizer 130 aid in delay of regeneration events, and thus, aid in preventing unnecessary or premature active regeneration events.

Upon receipt of the signal input from the optimizer 130, which incorporates the target value command based on the particulate matter filter conditions, the engine controller 16 controls operation of the engine so as to comply with the target value command. As seen in FIG. 2, the engine controller 16 is coupled to various engine components via inputs 102 by which signals containing values and/or commands, including the target value commands from the optimizer 130, may be received.

In some embodiments, the engine controller 16 is coupled to other sensors for receiving signals, which can be input to the controller 16 as inputs 102, stored in a memory 108 coupled to a processor 106, and interpreted by the processor 106. For example, the sensors may include engine out exhaust gas sensors 56, which may detect engine out exhaust gas characteristics including the engine out temperature of exhaust gas 52, the $O_2$ content of engine out exhaust gas 52, the $NO_x$ content of engine out exhaust gas 52, a lambda value of engine out exhaust gas 52, or a particulate matter content of engine out exhaust gas 52. The detected values of such engine out exhaust gas characteristics may then be communicated as electronic signals directed as inputs 102 to the controller 16.

The memory 108 of the controller 16 stores various values. In some embodiments, the memory 108 stores values in tables 110 for lookup by processor 106 for use in interpreting and determining values and generating command signals. For example, separate tables 110 may store engine reference values for nominal emissions output values, engine reference values for higher emissions output values, reference values for predetermined performance thresholds for engine components, and engine reference values for triggering particulate filter regeneration events.

As examples, such reference values for predetermined performance thresholds may include a set time interval between regeneration events of the particulate filter. In embodiments, the set time interval between regeneration events are based on a predetermined time limit between regeneration events, set in advance by a manufacturer of the engine, engine system, or control system, which may be based on a predetermined engine operating time. In some embodiments, the set time intervals are set on the basis of user input, such as operator settings, which may be selected and applied by an operator of the engine, engine system, or control system on the basis of engine operating factors such as operating conditions, duty cycles, local regulations that impact engine operation, and the like. In some embodiments, the set time intervals are set according to run-time conditions, which may be based on operating conditions and cycles, such as set time intervals based on input from sensors, such as readings from sensors of environmental conditions or locations, such as global positioning systems.

The reference values may also include, for example, a set or predetermined performance threshold triggering a regeneration event for the particulate filter, such as a particulate matter load limit. The tables 110 can produce various outputs as a function of various inputs, such as engine operating conditions, drive cycle, ambient conditions, or operator settings.

In an embodiment, the controller 16 interprets the target value commands received from the optimizer via inputs 102, and conveys via outputs 104 values and commands governing engine operation. The engine controller 16 is coupled to various engine components via outputs 104 by which signals may be conveyed that contain values and/or commands. In the illustrated embodiment, the one or more outputs 104 provide command signals to the air charge section 22, fuel charge section 20, and EGR device 24. The command signals may contain engine output commands to control the engine operation by commanding adjustments to engine operation, such as increasing or decreasing certain engine operating parameters, or by commanding that the engine operation parameters continue in a steady state.

For example, the engine controller 16 can provide a signal commanding adjustments in the fuel section 20 increasing or decreasing the amount, or changing the type, of the fuel 40 supplied to the engine 12. The signal may command adjustments in the air charge section 22 increasing or decreasing the amount of fresh charge air 42 charged into the engine 12. As further examples, the signal may command adjustments to the volume of the EGR flow or otherwise adjust the EGR fraction.

In an embodiment, such adjustments are made order to increase or decrease engine out particulate matter, $NO_x$, and/or $O_2$ levels in the engine out exhaust gas. These adjustments are commanded as the result of the determinations of the optimizer 130 of the target value (or range of values) of the engine out particulate matter, $NO_x$, and/or $O_2$ levels in the engine out exhaust gas required to optimize engine operations so as to continuously control soot loading rates, so as to delay regeneration events, as a function of actual or estimated particulate filter conditions. In this manner, determining a limit of an exhaust gas characteristic is based on the particulate matter load rate; and then the engine operation is controlled in a manner such that the exhaust gas characteristic is controlled to satisfy the limit.

In an embodiment, instead of commands to increase or decrease adjustments, the signals may contain commands to control engine operations at their current conditions, that is, signals commanding that engine operations be continued to maintain conditions in a steady state, instead of making adjustments to increase or decrease engine operating parameters.

Thus, the commands generated as the result of the operations of the characterizer 120 and optimizer 130 aid in preventing unnecessary or premature active regeneration events. The commands thus generated control certain engine operations to be increased or decreased, and/or maintained in a steady state, to optimize engine operations so as to continuously control soot loading rates. In turn, these operations may preferably delay regeneration events, directly in response to actual or estimated particulate filter conditions.

The controller may preferably be adapted to determine the optimal methods for adjusting the operations of the various engine components in order to satisfy the commands. For example, modules or settings of the controller may be adapted to prioritize changes in the amount of fresh air charge over changes in fuel supply amounts, or vice versa. Other engine operations or components may also be commanded to adjust operations to comply with commands in order to satisfy the demand for increase or decrease in engine out temperature, particulate matter, $NO_x$, and/or $O_2$ levels. Urea dispensing systems, SCR systems, desulfuration mechanisms, and the like, are examples of other engine components that may similarly be directed to change operational parameters to satisfy commands aimed at optimizing conditions for maintaining a target soot accumulation rate in the particulate filter.

Another benefit of the optimization operations described above is that the optimization system collects and interprets data on exhaust gas characteristics, and may also collect and interpret data on adjustments required by the commands. This collected data may be useful in conducting engine diagnostics, serving as a data signature for engine operational deficiencies. For example, a long term decrease in engine out particulate matter commanded for particulate matter regeneration purposes and/or for delaying active regeneration in the filter may indicate an excessive build-up of ash in the filter, indicating a need for servicing of the filter.

Many aspects of this disclosure are described in terms of sequences of actions to be performed by elements of a system, such as modules, a controller, a processor, a memory, and/or a computer system or other hardware capable of executing programmed instructions. Those of skill in the art will recognize that these elements can be embodied in an engine controller 16 of an engine system 10, such as an engine control unit (ECU), also described as an engine control module (ECM), or in a controller separate from, and communicating with an ECU. In some embodiments, the engine controller 16 can be part of a controller area network (CAN) in which the controller, sensor, actuators communicate via digital CAN messages. It will be recognized that in each of the embodiments, the various actions for implementing the regeneration optimization strategy disclosed herein could be performed by specialized circuits (e.g., discrete logic gates interconnected to perform a specialized function), by application-specific integrated circuits (ASICs), by program instructions (e.g. program modules) executed by one or more processors (e.g., a central processing unit (CPU) or microprocessor or a number of the same), or by a combination of circuits, instructions, and processors. All of which can be implemented in a hardware and/or software of the ECU and/or other controller or plural controllers.

Logic of embodiments consistent with the disclosure can be implemented with any type of appropriate hardware and/or software, with portions residing in the form of computer readable storage medium with a control algorithm recorded thereon such as the executable logic and instructions disclosed herein. The hardware or software may be on-board or distributed among on-board and off-board components operatively connected for communication. The hardware or software can be programmed to include one or more singular or multidimensional lookup tables and/or calibration parameters. The computer readable medium can comprise a random access memory (RAM), a read-only memory (ROM), an erasable programmable read-only memory (EPROM or Flash memory), an optical fiber, a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

The method disclosed herein may be described as a method of operating an internal combustion engine that includes a step of determining the performance threshold of the particulate filter disposed in the exhaust gas flow, where the engine has a set time interval between regeneration events of the particulate filter. The method further may include steps of determining a rate at which the particulate filter is reaching the performance threshold, and controlling the exhaust gas characteristics to control the rate so that the performance threshold is reached at or just before an end of the time interval. More detailed explanation of the method is provided in connection with FIG. 3 below.

Figure 3:
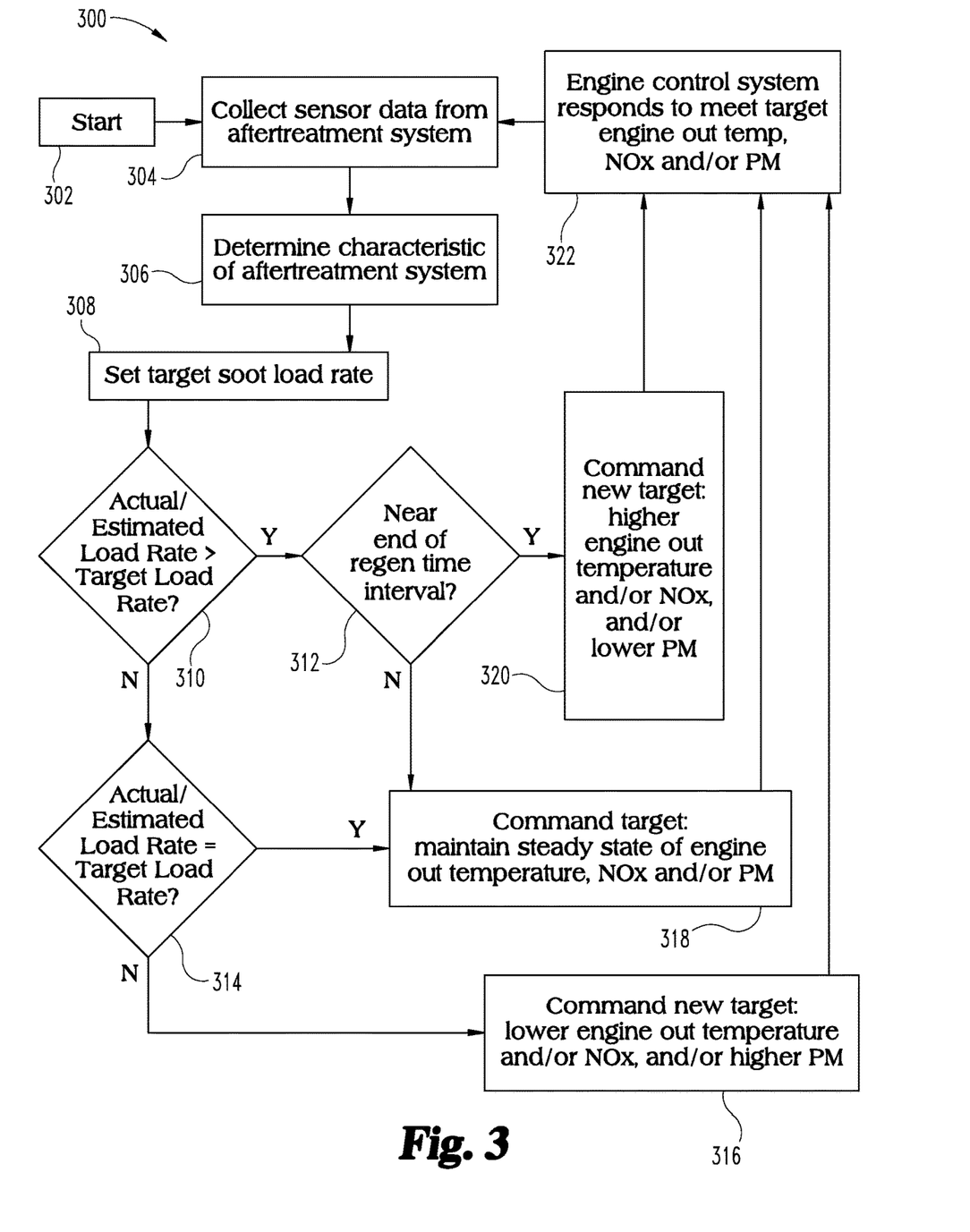
FIG. 3 is a schematic diagram representing a method of operating an engine system to regenerate a particulate filter, according to some embodiments.

FIG. 3 is a schematic flowchart of an example of the method 300 of operating an engine system 10 according to some embodiments. In some embodiments, method 300 is a routine stored in memory 108 of engine controller 16 and executed by processor 106. At the start step 302, an engine system 10 is operating in nominal operation conditions. At step 304, a module of the optimization system collects sensor data from the aftertreatment system. In particular, at this step 304, the module may receive signals from the pressure sensor 32 and temperature sensor 34 representing pressure values and temperature values detected by the sensors in the aftertreatment system, and in particular, in the particulate filter 28. The signals may represent the detected conditions in the particulate filter 28, the conditions preferably including existing soot load detected in the particulate filter, the pressure differential across the particulate filter 28, and the exhaust gas temperature in the particulate filter.

At step 306, the characterizer module 120 interprets the detected conditions to determine the characteristics of the aftertreatment system, in this example, determining the characteristic of the level of particulate matter load currently present on the particulate filter 28. The characterizer then communicates this characteristic to the optimizer module 130.

The optimizer 130 may use this characteristic of particulate matter load level to make its next determination at step 308. The step 308 may include determining an actual or estimated particulate matter loading rate, taking into consideration other system conditions, such as engine out exhaust gas temperature, engine out exhaust gas particulate matter content and concentration level, and engine out exhaust gas concentration levels of $O_2$ and/or $NO_2$, in order to determine or estimate the particulate matter loading rate. The optimizer 130 may then determine a target particulate matter loading rate, which may be a particulate matter loading rate optimized to delay onset of active regeneration events. The optimizer may interpret the determined (i.e., the actual or estimated) loading rate in comparison to the target loading rate at steps 310 and 314 to decide if the actual/estimated loading rate is less than, equal to, or greater than the target loading rate. It is noted generally with respect to the method steps and under the features of the engine and systems described herein, that in making the determinations of any "actual" values, such determinations may be made on the basis of estimations instead of actual measurements.

If, at step 310, the actual or estimated particulate matter loading rate is determined to be greater than the target loading rate, then the optimizer will proceed to step 312 at which the optimizer will determine whether the engine system is close to the end of a predetermined engine operating time interval between active particulate filter regeneration events. The predetermined engine operating time interval may be a reference value stored in the memory 108, accessed by the system to make the determination at step 312.

If, at step 312, the optimizer determines that the system is close to an end of a predetermined engine operating time interval between active regeneration events, then the optimizer will proceed to step 320. At step 320, the optimizer may command engine operation to yield engine out exhaust gas conditions for active regeneration. In particular, the command may include operational commands to engine components to increase engine out exhaust gas temperature, to increase engine out $NO_x$ levels in the exhaust gas, and/or to reduce the level of engine out particulate matter in the exhaust gas. This step at 320 thus may represent a command to conduct an active regeneration event of the particulate filter. The command at step 320 may be conveyed via the controller. The command may incorporate a target value command based on the particulate matter filter conditions, to command control of operation of the engine so as to provide engine out exhaust gas characteristics that comply with a particular target value (or range of values) on specified parameters such as engine out $NO_x$ or particulate matter levels, or temperature.

If, at step 312, the optimizer determines that the system is not close to an end of a predetermined engine operating time interval between active regeneration events, then the optimizer may proceed to step 318, wherein the optimizer will command engine operation to yield engine out exhaust gas conditions wherein the conditions are allowed to remain static (i.e., maintain operations in a steady state). This step at 310 thus represents a command of a continued state of passive regeneration of the particulate filter.

If, at step 310, the determined (that is, the actual or estimated) particulate matter loading rate is determined to be less than or equal to the target loading rate, the optimizer then may determine at step 314 whether the actual/estimated loading rate is approximately equal to the target loading rate. If so, then the optimizer may preferably command, at step 318, that the engine operation should be controlled to yield engine out exhaust gas conditions wherein the conditions are allowed to remain static (i.e., maintain engine operations in a steady state). This step at 318 thus represents a command of a continued state of passive regeneration of the particulate filter, as the actual/estimated loading rate is acceptable for delaying trigger of an active regeneration event.

If, at step 314, the optimizer determines that the actual or estimated loading rate is not equal to (i.e., lower than) the target loading rate, then the optimizer may preferably command, at step 316, that the engine operation should be controlled to yield engine out exhaust gas conditions wherein the conditions may include a lower engine out exhaust gas temperature, a lower engine out $NO_x$ level in the exhaust gas, and/or a higher engine out particulate matter level in the exhaust gas. This step at 316 thus also represents a command of a continued state of passive regeneration of the particulate filter, although in view of the acceptably low actual/estimated loading rate, other engine operation parameters, for example operator settings, may be optimally met by controlling the conditions so that they may include a lower engine out exhaust gas temperature, a lower engine out $NO_x$ level in the exhaust gas, and/or a higher engine out particulate matter level in the exhaust gas.

At step 322, the engine control system responds to meet the commands provided at step 316, 318, or 320. The engine control system responds by controlling engine components, which may include the air charge section 22, fuel charge section 20, and EGR device 24, to respond to the commands by maintaining steady state operation, or by adjusting operation to comply with the commands and meet target values for engine out temperature, particulate matter, $NO_x$, and/or $O_2$ levels. The control at step 322 may include commanding steady state operation. The control at step 322 may include commands to the fuel section 20 increasing or decreasing the amount, or changing the type, of the fuel 40. The commands may include the air charge section 22 increasing or decreasing the amount of fresh charge air 42 charged into the engine 12. The commands may include changes in the EGR flow value. These controls in turn will increase or decrease engine out temperature, particulate matter, $NO_x$, and/or $O_2$ levels in the engine out exhaust gas to comply with the commands received in step 322. In accord with flowchart of FIG. 3, the method thus is designed to ensure that particulate matter load level in the particulate filter will not exceed the performance threshold of a load level high enough to trigger an active regeneration event. Instead, following the yes/no sequence of the flowchart, the particulate matter load level will be maintained at or below the load level limit, near or at the time that a timer-based regeneration event would be triggered by system settings.

The resulting changes in the exhaust gas characteristics caused by the engine control commands of step 322 are detected by sensors and the detected values are again collected by the characterization module in a feedback loop to step 304. The collected data may be useful to conduct diagnostics of engine operations, serving as a signature for operational deficiencies or faults.

One of skill in the art may appreciate from the foregoing that unexpected benefits are derived from application of the method, system, and apparatus to the problem of optimizing regeneration events in operating an engine system, without the need for additional components or parts, or changes in the configuration of a conventional vehicle or its features. Changes to configuration of a conventional engine system may add costs, weight, and complexity to manufacture, operation, and maintenance of the engine system. A key benefit contemplated by the inventors is improvement of control of regeneration events in a conventional engine system through use of the disclosed optimization system, method, or apparatus, while excluding any additional components, steps, or change in structural features. In this exclusion, maximum cost containment may be effected. Accordingly, the substantial benefits of simplicity of manufacture, operation, and maintenance of standard or conventionally produced vehicles as to which the method and system may be applied may reside in an embodiment of the invention consisting of or consisting essentially of features of the method, system, or apparatus disclosed herein. Thus, embodiments of the invention contemplate the exclusion of steps, features, parts, and components beyond those set forth herein. The inventors contemplate, in some embodiments, the exclusion of certain steps, features, parts, and components that are set forth in this disclosure even when such are identified as preferred or preferable.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the invention should, therefore, be determined with reference to the appended claims, along with the full scope of equivalents to which such claims are entitled.

The invention claimed is:

1. A method of operating an internal combustion engine, comprising:
   determining a performance threshold of a particulate filter disposed in an exhaust gas flow of the internal combustion engine having a set time interval between regeneration events of the particulate filter;
   determining a rate at which the particulate filter is reaching the performance threshold; and
   controlling an exhaust gas characteristic to continuously control the rate so that the performance threshold is reached at or just before an end of the time interval.

2. The method according to claim 1, wherein the performance threshold is a particulate matter load limit.

3. The method according to claim 2, wherein the rate is a particulate matter load rate.

4. The method according to claim 1, wherein the time interval is an engine operating time interval.

5. The method according to claim 1, wherein the internal combustion engine is a compression ignition internal combustion engine.

6. The method according to claim 1, wherein the exhaust gas characteristic is at least one of an exhaust gas temperature, an exhaust gas $O_2$ content, an exhaust gas particulate matter content, and an exhaust gas $NO_2$ content.

7. The method according to claim 1, wherein determining the rate comprises detecting at least one of a pressure differential across the particulate filter, an exhaust flow rate through the particulate filter, a particulate matter load on the particulate filter, and a temperature of exhaust gas in the particulate filter.

8. The method according to claim 1, wherein controlling the rate comprises controlling engine operation to maintain a steady state of engine operation parameters.

9. The method according to claim 1, wherein controlling the rate comprises controlling engine operation to increase or decrease engine operation parameters.

10. The method of claim 1, wherein controlling the exhaust gas characteristic includes controlling the exhaust gas characteristic within an operable range for delaying an onset of a regeneration event.

11. A control system for an internal combustion engine that produces an exhaust gas flow, comprising:
    an input adapted to receive a value of at least one of a pressure differential across a particulate filter disposed in the exhaust gas flow, an exhaust flow rate through the particulate filter, and a particulate matter load on the particulate filter;
    an output adapted to provide an engine operation command to the engine; and
    a processor coupled to the input and to the output, the processor configured to:
      determine a performance threshold of the particulate filter and a set time interval between regeneration events of the particulate filter;
      in response to the value, determine a rate at which the particulate filter is reaching the performance threshold; and
      control an exhaust gas characteristic to continuously control the rate so that the performance threshold is reached at or just before an end of the time interval.

12. An engine system, comprising:
    an internal combustion engine adapted to produce an exhaust gas flow;
    a particulate filter disposed in the exhaust gas flow;
    at least one sensor adapted to detect a value of at least one of a pressure differential across the particulate filter, an exhaust flow rate through the particulate filter, and a particulate matter load on the particulate filter; and
    a control system coupled to the engine, including an input coupled to the control system and adapted to receive the value from the sensor, the control system being configured to:
      determine a performance threshold of the particulate filter and a set time interval between regeneration events of the particulate filter;
      in response to the value, determine a rate at which the particulate filter is reaching the performance threshold; and
      output an engine operation command to the engine to control an exhaust gas characteristic to continuously control the rate so that the performance threshold is reached at or just before an end of the time interval.

13. A method of operating an internal combustion engine, comprising
    interpreting a filter condition of a particulate filter disposed in an exhaust gas flow of an internal combustion engine;
    determining a particulate matter load rate of the filter as a function of the filter condition;
    determining a limit of an exhaust gas characteristic based on the particulate matter load rate; and
    controlling engine operation to continuously control the exhaust gas characteristic to satisfy the limit and output particulate matter from the internal combustion engine at the determined particulate matter load rate.

14. The method according to claim 13, wherein the filter condition is at least one of a pressure differential across the particulate filter, an exhaust flow rate through the particulate filter, and a particulate matter load on the particulate filter.

15. The method according to claim 13, wherein the exhaust gas characteristic is at least one of an exhaust gas temperature, an exhaust gas particulate matter content, an exhaust gas $O_2$ content, and an exhaust gas $NO_2$ content.

16. The method according to claim 13, wherein controlling engine operation comprises at least one of controlling a fuel system actuator and an air handling actuator of the internal combustion engine.

17. The method according to claim 13, wherein the internal combustion engine is a compression ignition engine and the particulate filter is a diesel particulate filter.

18. The system of claim 13, wherein controlling the exhaust gas characteristic includes controlling the exhaust gas characteristic within an operable range for delaying an onset of a regeneration event.

19. A control system for an internal combustion engine that produces an exhaust gas flow, comprising:
    an input adapted to receive a value of a filter condition of a particulate filter disposed in the exhaust gas flow, the filter condition comprising at least one of a pressure differential across the particulate filter, an exhaust flow rate through the particulate filter, and a particulate matter load on the particulate filter;
    an output adapted to provide an engine operation command to the engine; and
    a processor coupled to the input and to the output, the processor configured to:
      interpret the value of the filter condition;
      determine a particulate matter load rate of the filter as a function of the filter condition;
      determine a limit of an exhaust gas characteristic based on the particulate matter load rate; and
      control engine operation to continuously control the exhaust gas characteristic to satisfy the limit and output particulate matter from the internal combustion engine at the determined particulate matter load rate.

20. An engine system, comprising:

an internal combustion engine adapted to produce an exhaust gas flow;

a particulate filter disposed in the exhaust gas flow;

at least one sensor adapted to detect a value of a filter condition of the particulate filter, the filter condition comprising at least one of a pressure differential across the particulate filter, an exhaust flow rate through the particulate filter, and a particulate matter load on the particulate filter; and a control system coupled to the engine, including an input coupled to the control system and adapted to receive the value from the sensor, the control system being configured to:

interpret the value of the filter condition;

determine a particulate matter load rate of the filter as a function of the filter condition;

determine a limit of an exhaust gas characteristic based on the particulate matter load rate; and control engine operation to continuously control the exhaust gas characteristic to satisfy the limit and output particulate matter from the internal combustion engine at the determined particulate matter load rate.

* * * * *